(12) United States Patent
Schousek et al.

(10) Patent No.: US 6,188,742 B1
(45) Date of Patent: Feb. 13, 2001

(54) EVENT COUNTER AND METHOD FOR DRIVING A CIRCUIT DEVICE

(76) Inventors: Theresa Jean Schousek; Brian Walter Schousek, both of 660 Monette Ave. #11, New Richmond, WI (US) 54017

( * ) Notice: Under 35 U.S.C. 154(b), the term of this patent shall be extended for 0 days.

(21) Appl. No.: 09/167,176

(22) Filed: Oct. 6, 1998

Related U.S. Application Data

(60) Provisional application No. 60/061,192, filed on Oct. 6, 1997.

(51) Int. Cl.$^7$ .................................................. G01D 21/00
(52) U.S. Cl. ............................................................ 377/19
(58) Field of Search ................................................ 377/19

(56) References Cited

U.S. PATENT DOCUMENTS 4,807,639 * 2/1989 Shimizu et al. ...................... 128/690

* cited by examiner

Primary Examiner—Margaret R. Wambach
(74) Attorney, Agent, or Firm—Reidlaw, L.L.C.; John S. Reid

(57) ABSTRACT

An event counter is disclosed which, in one embodiment, provides a reaction timer to time a user's response time to an event. In a second embodiment, the event counter provides a counting device to count the number of occurrences of events or the magnitude of an event. The invention uses a commercially available stopwatch to time the response time. The start/stop switch of the stopwatch is connected to a signal generator such as a piezoelectric element. In one variation, the internal piezoelectric element used as a beeper in the stopwatch is used as the signal generator. In a second variation, the event timer is further provided with a circuit to allow a higher voltage LED to be driven by a lower voltage of the system battery. In yet another variation, the event timer further includes a random delay circuit to randomly delay the start time of the stopwatch. Random delay is provided without a microprocessor by using a variable current switch and two RC circuits having different tau values. The differential voltage of the two RC circuits is used to activate the start/stop switch.

37 Claims, 5 Drawing Sheets

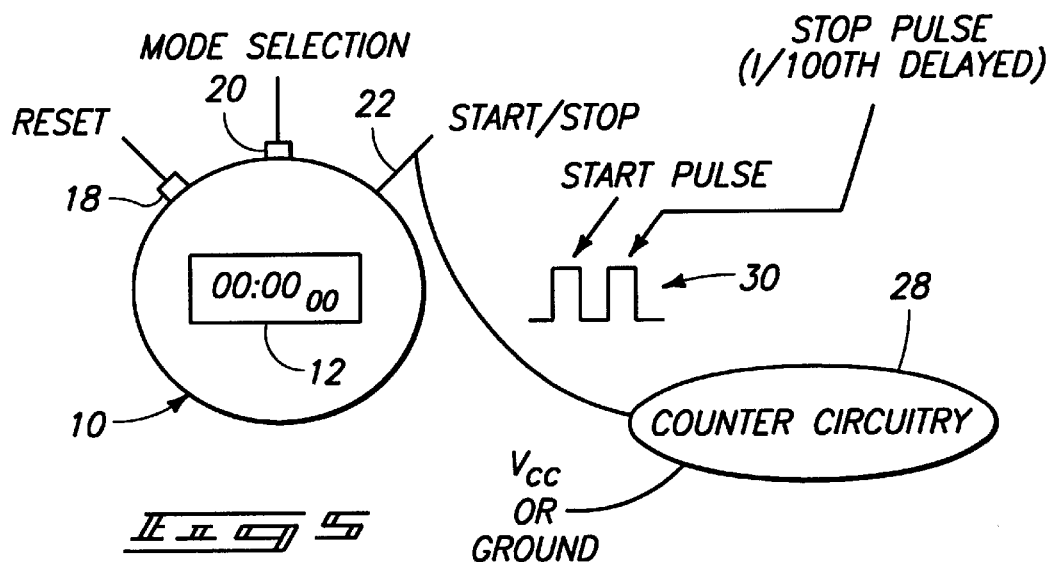
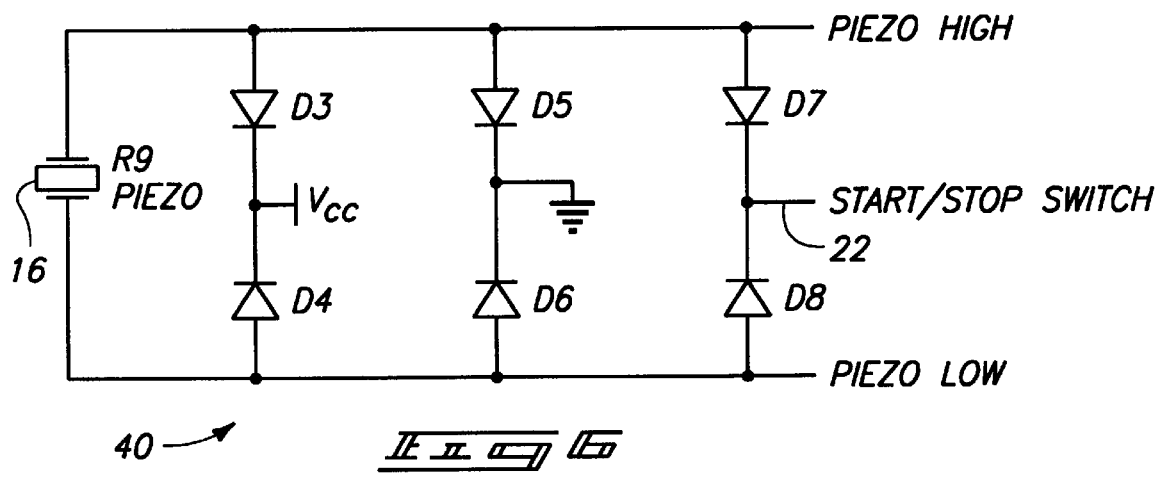
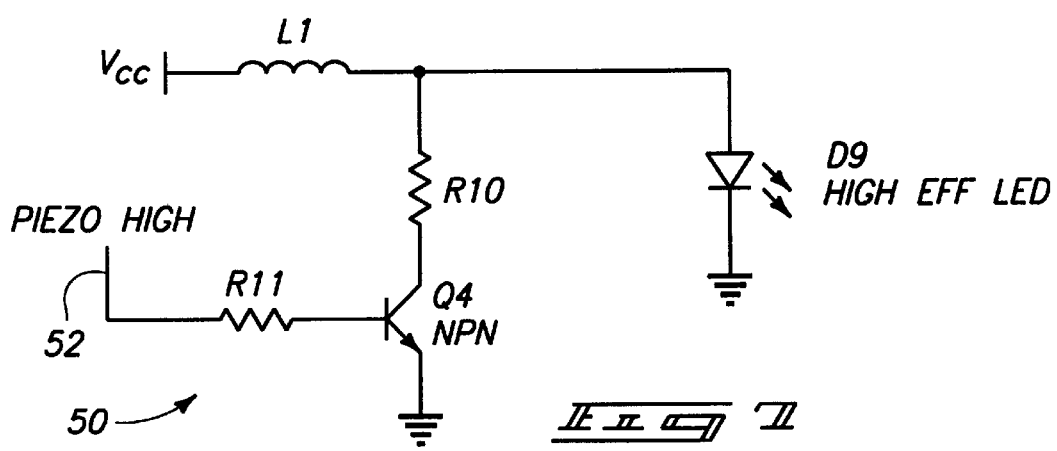

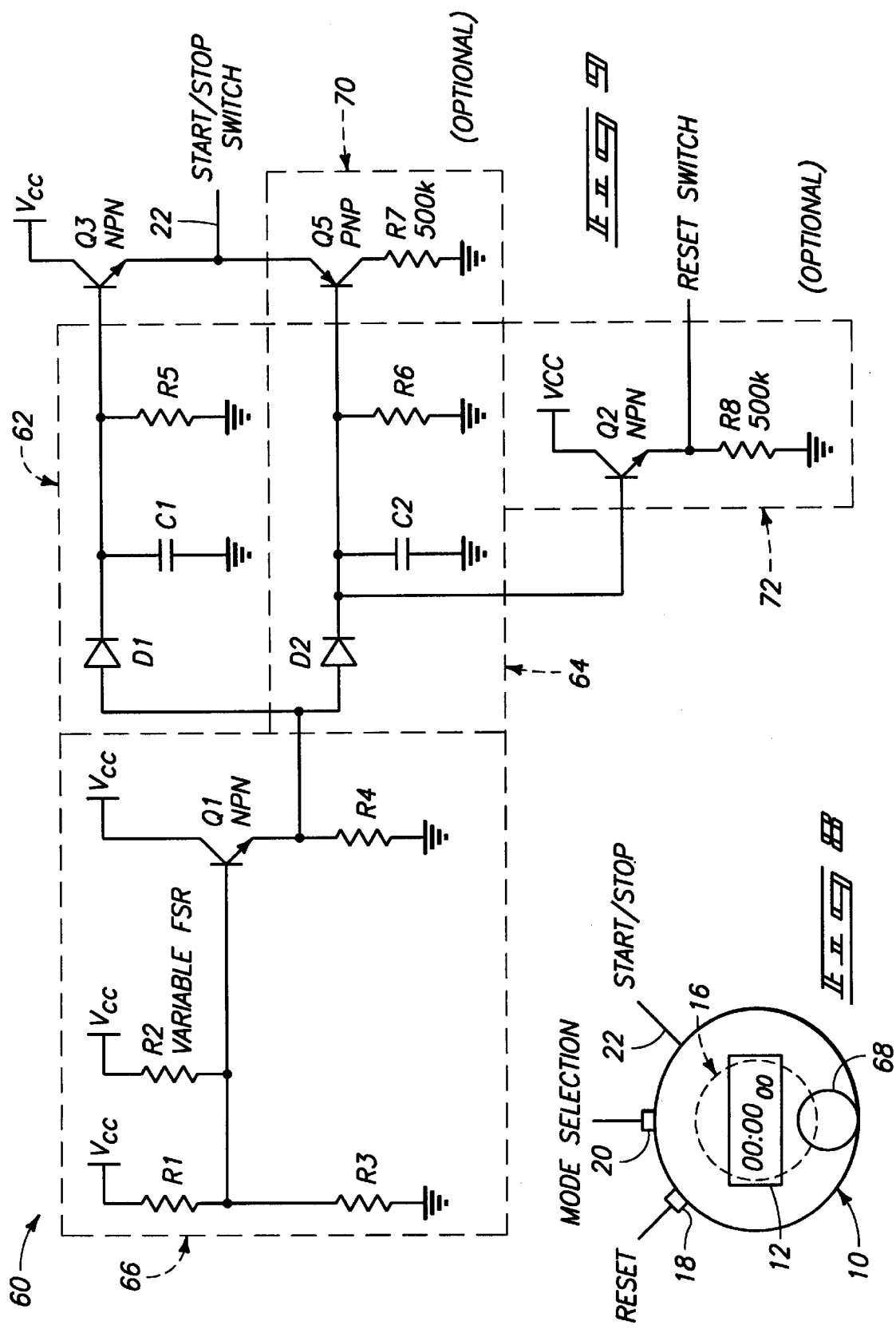

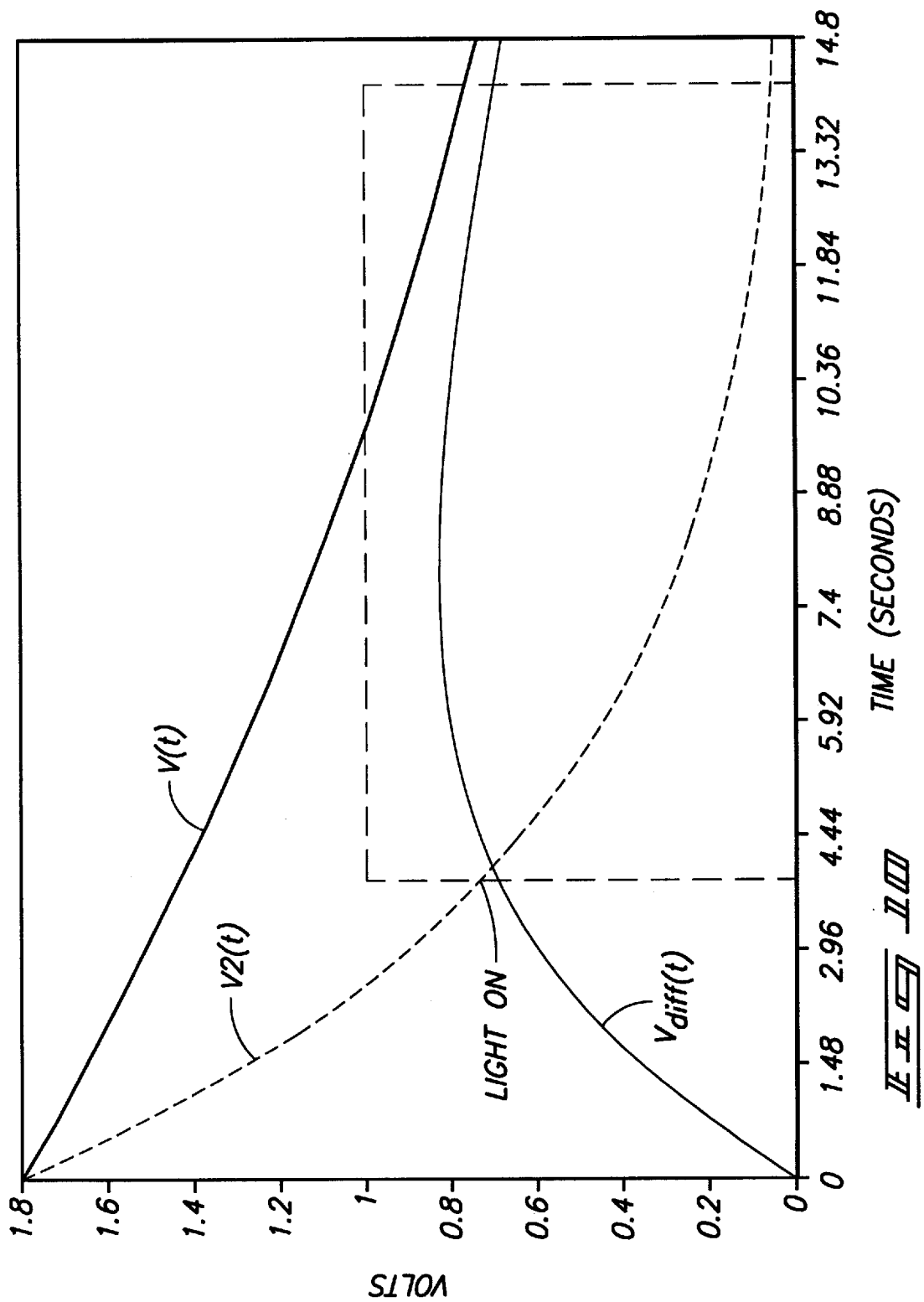

EVENT COUNTER AND METHOD FOR DRIVING A CIRCUIT DEVICE

CROSS REFERENCE TO RELATED APPLICATION

This application claims priority from U.S. Provisional Application Ser. No. 60/061,192, filed Oct. 6, 1997, titled "Reaction Timer".

FIELD OF THE INVENTION

This invention relates to the field of electronic event counters, including reaction timers and counter modules, and to a method of constructing such devices using a watch with stopwatch functions.

BACKGROUND OF THE INVENTION

Many recreational devices are designed to be interactive with a user and, in particular, are configured to measure a length of time between an event and the user's response to the event, or to measure the level of response of the user to the event. For example, in martial arts training, response time is measured between the time a buzzer sounds or a light flashes and the user responds by kicking or hitting a bag or the like. Once the user has responded by hitting the bag or the like, it is desirable to stop the timer so that the user can then measure their response time from the event. The user then attempts to improve their response time by repeating the process. In other applications, it is desirable to measure the strength of a user's impact on a device such as a punching bag, or the number of times the bag is hit.

In designing and manufacturing recreational items for measuring response times and impact and the like, the devices are typically provided with electronics for performing the desired functions. Thus, it is desirable to find a way to provide such electronics which are relatively inexpensive, easy to manufacture, and are easily replaceable.

SUMMARY OF THE INVENTION

In a first aspect, the invention describes an event counter having an integral stopwatch. The integral stopwatch includes an internal clock for generating electrical clock pulses of a predetermined period, a timing circuit for counting the number of clock pulses, an output circuit for outputting an elapsed number of clock pulses generated by the clock, and a reset switch for resetting the output circuit to a base level. A start/stop switch is provided for starting and stopping the timing circuit. A pulse signal generator is configured to alter the state of the start/stop switch as a result of a pulse signal that is generated by the pulse signal generator.

In a first embodiment of the invention, the event counter is used as a response timer to measure the time of response of a user between an event such as an alarm or a flash of light and the user's response thereto. A piezoelectric element is used as the pulse signal generator and is configured to generate the pulse signal upon impact by the user.

In a second embodiment of the invention, the event counter is configured as a counter display to count the number of pulses generated by the pulse signal generator or the magnitude of an event, and display this information. In this configuration, the invention further comprises a counter circuit configured to generate a plurality of pulse signals of an even number in proportion to the number of cumulative events or the magnitude of a single event. The signals alter the state of the stop/start switch the number of times equal to the plurality of pulse signals to thereby start and stop the clock the same number of times. This generates a number of clock pulses equal to one-half the number of pulse signals. This number can then be displayed to indicate the number of pulse signals which are representative of the number of events or the magnitude of the event. An example of an application is a piezoelectric element used to the number of impacts on a target measure of the strength of an impact from a user on the target.

In a third embodiment of the invention, the event counter incorporates a random time delay circuit to randomly generate an event which is perceived by a user. Thereafter, the response period of the user to the event is measured. In this embodiment, the event counter includes a delay circuit having first and second RC circuits having different tau values. The differential decay of the two voltages in the RC circuits is used to activate a switch which starts the timer and also signals the user that the timer has started.

In a fourth embodiment of the invention, the event counter further includes a circuit for driving a signal indicator, such as a beeper or an LED, by use of a low voltage power supply and a piezoelectric element. The piezoelectric element is used to alternately turn on and off a switch such as a transistor and, thereby, use the low voltage to charge an inductor. When the piezoelectric element is in the off state, the inductor discharges through the signal indicator.

A second aspect of the invention is a method of driving a circuit device requiring a first voltage by using a reference voltage of a lower value than the first voltage in conjunction with a signal device which generates a voltage pulse of insufficient power to drive the circuit device. An example of the signal device is a piezoelectric element. The method includes the steps of providing a current storage device in electrical communication with the reference voltage and the circuit device. An example of a current storage device is an inductor. A switch is provided which can be activated to a first position by the voltage pulse from the signal device. In the first position, the switch allows the reference voltage to flow electrical current to the current storage device. In a second position, which coincides with the absence of the voltage pulse, no current flows through the current storage device. At this point, if sufficient current is stored in the current storage device, it will flow through the circuit device. The method further includes the steps of applying the reference voltage to the circuit device, the current storage device, and the switch when the switch is in the second position. The voltage pulse from the signal device is applied to the switch to allow current to flow into the current storage device and, thereby, store sufficient current to drive the circuit device with the first voltage. The voltage pulse is then removed from the switch to allow current to flow from the current storage device through the circuit device. The circuit device can comprise an indicator such as an LED and/or a start/stop switch for the clock in the internal stopwatch to alert the user and start the timer.

BRIEF DESCRIPTION OF THE DRAWINGS

FIG. 5 is a schematic diagram showing a second embodiment of the present invention wherein the pulse generator comprises a counter circuit.

FIG. 6 is a schematic circuit diagram showing how an audio piezoelectric element, which can be integral to the integral stopwatch, can be used as the pulse generator.

FIG. 7 is schematic circuit diagram showing additional circuitry that can be used with the event counter of the present invention to drive a signal indicator, here an LED.

FIG. 8 is a schematic diagram of a third embodiment of the invention wherein the event counter further comprises a random time delay feature for starting the clock in the stopwatch.

FIG. 9 is a schematic circuit diagram showing circuitry which can be used to implement the random time delay feature of FIG. 8.

FIG. 10 is a graph showing the relative voltage decays of the first and second RC circuits in the schematic diagram of FIG. 9 and the point at which they activate the start/stop switch for the clock.

DETAILED DESCRIPTION OF PREFERRED EMBODIMENTS OF THE INVENTION

The invention is described herein as an event counter. Thus, the invention is intended to count events such as a number of time units or the size of an event such as an impact on a sensor. In one embodiment, the invention comprises a reaction timer for timing the period between an event and a user's response to the event. In a second embodiment, the invention comprises an event display to display the number of events detected or the size or magnitude of an event detected at a sensor such as a pressure sensor. In a third embodiment, the event counter further comprises a delay circuit for delaying the event to which a user thereafter responds, preferably in the embodiment of the invention comprising a reaction timer. In a fourth embodiment, the event counter further comprises a circuit for driving a signal indicator such as a lamp or a beeper using the system voltage. As the system voltage may be insufficient by itself to drive a signal indicator, means are provided to accumulate sufficient current to provide a voltage spike sufficiently high enough to drive the signal indicator. The invention discloses an apparatus for accomplishing this which relies on a piezoelectric element drive circuitry such as is used to generate an audible signal.

The invention can be implemented using a standard watch or stopwatch integrated circuit which is commercially available. The additional circuit devices used to complete the apparatus of the present invention are relatively few. This combination permits low-cost implementation of the event counter in its various embodiments using standard products (such as watches and stopwatches) by using the watch display and circuitry as components of the overall system, and allowing utilization of pretooled packaging of the watch system. Implementations of various embodiments of the event timer will now be discussed in detail.

Reaction Timer

Figure 1:
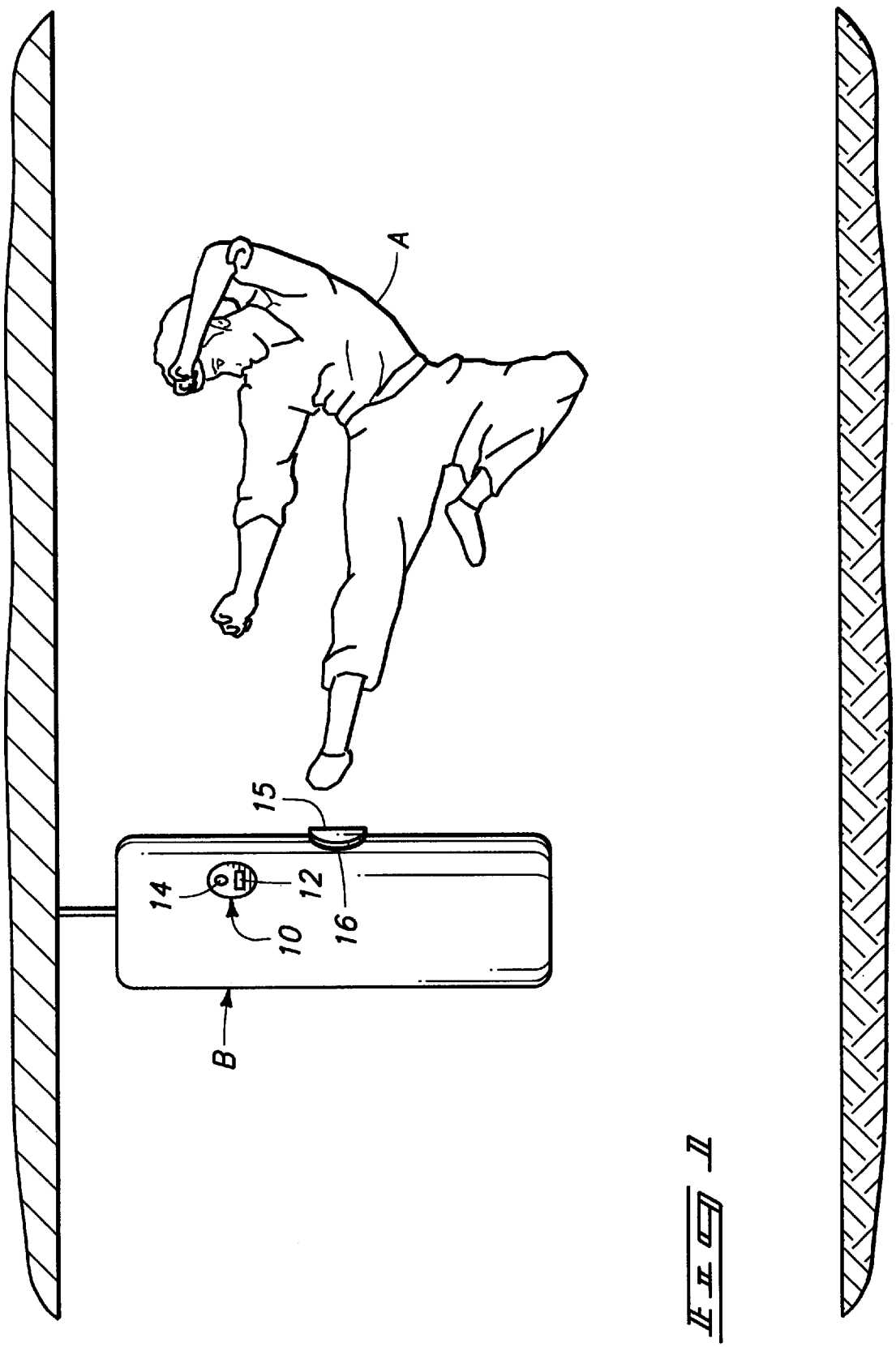
FIG. 1 is an environmental view showing a user using a recreational kick bag which contains an apparatus in accordance with the present invention.
Figure 2:
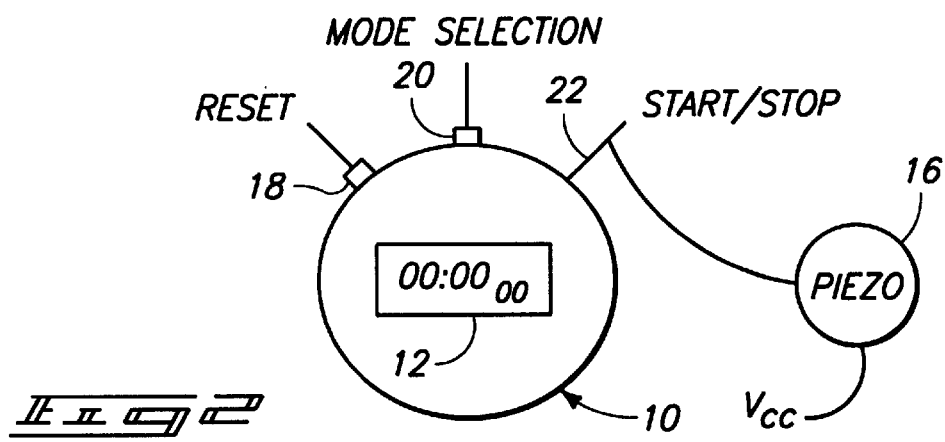
FIG. 2 is a schematic diagram showing one embodiment of the present invention wherein the event counter is configured to act as a reaction timer.

FIG. 1 shows an environmental view wherein the first embodiment of the invention may be used. The embodiment comprises a reaction timer 10 which is placed into a kickbag "B" which is intended to be hit by a user "A". When the user "A" strikes target 15, which contains the piezoelectric element 16, the clock in the stopwatch 10 stops and the elapsed time before the user struck the piezoelectric element is displayed on the display 12. Turning to FIG. 2, a schematic diagram shows the implementation of the first embodiment of the event counter. Stopwatch 10 can comprise any commercially available stopwatch having normal clock and/or stopwatch features. Such features include a start/stop switch 22 for starting and stopping the clock or the timer; a reset switch 18 for resetting the display 12 to a zero time; and a mode selection switch 20 for selecting various modes in the unit, for example, watch mode, stopwatch mode, calendar mode, etc. The stopwatch 10 comprises an internal clock for generating electric clock pulses of a predetermined period and a timing circuit for keeping track of the elapsed number of clock pulses. An output circuit is also provided in the integral stopwatch 10 for outputting the elapsed number of clock pulses generated by the clock. Such output can be displayed on the display 12. The invention further includes the piezoelectric element 16 which functions as a pulse signal generator to alter the state of the stop switch as a result of a pulse signal generated by the piezoelectric element. The piezoelectric element is also connected to a reference voltage $V_{cc}$ which can comprise one side of a battery integral to the stopwatch. Commercially available stopwatches are typically provided with small batteries having a nominal voltage of 1.5v. Commercially available stopwatches are typically configured to operate with a voltage as low as 0.9v.

Piezoelectric elements are configured to generate a relatively high voltage but low amperage signal upon impact. This high voltage can be used to toggle the start/stop switch from a start position to a stop position or vice versa. In the embodiment shown in FIG. 2, the piezoelectric element 16 is electrically connected to the start/stop switch 22 such that a voltage pulse from piezoelectric element 16 causes the switch to toggle to the stop position. Thus, in the operation of the apparatus of FIG. 2, if the integral stopwatch is provided with a mode select switch 20 to select the stopwatch mode, the user will first select the stopwatch mode. The user then presses the reset switch 18 to clear the display 12 to zero. A first user then presses the start/stop switch 22 to start the clock. A second user, such as the martial artist "A" of FIG. 1, then reacts to the start of the timer and strikes the target 15, causing the piezoelectric element 16 to generate a pulse which is detected by start/stop switch 22, causing the switch to move to the stop position and the timer to stop. The elapsed time between the start of the timer and the stop of the timer is displayed on the display 12. This provides the user with an elapsed time or a reaction time.

The user can also use the circuit to register the time between strikes or the cumulative time of a sequence of strikes. The user can use the strike force to start the timer as well as to stop the timer. In this implementation, the user does not activate the start button, but simply initiates the sequence of strikes. The user can simply strike the bag twice to first activate the start, and then activate the stop. This shows the user the time between strikes. Alternatively, a sequence of six strikes will start the timer on strike 1, stop on strike 2, start again on strike 3, stop on strike 4, start again on strike 5, and stop on strike 6. As the reset button is not pressed between strikes, this will show a cumulative number indicating the sum of the time between strikes 1 & 2, 3 & 4, and 5 & 6.

Commercially available stopwatches are traditionally provided with an audio signal generator such as a piezoelectric element which beeps when the stopwatch is started. This beep can be the signal for the second user to strike the target to stop the stopwatch. The signal generator or piezoelectric element can be secured to the target 15 by being either sewn into the fabric of the bag, attached with Velcro, glued, or attached with other obvious means.

It should be noted that the apparatus can be contained within or mounted on the surface of the bag "B" of FIG. 1. In addition, the apparatus can be contained in the bag being struck or, alternatively, in the striking device such a glove or boot. If the apparatus is mounted in the glove or boot, then it can be used during actual combat practice when striking a person.

Piezoelectric elements typically generate both positive and negative electrical pulses, in excess of 100v, upon the incidence of a vibration. In addition to being connect to $V_{cc}$, the piezoelectric element 16 can be tied directly between any known system voltage level (such as ground, battery, or some switch reference voltage), with the other contact of the piezoelectric element connected to the start-stop switch 22 as shown in FIG. 2. If the piezoelectric element 16 is tied to ground, when the piezoelectric element hits system voltage $V_{cc}$, the switch 22 is activated and the stop watch 10 stops upon receiving this strike pulse. Ground provides the most sensitive response to the system. Battery voltage $V_{cc}$, or any other known system voltage, can be used if ground is not easily accessible. Alternative voltage references can be used to vary the piezoelectric element sensitivity to vibration strength (i.e. requiring a stronger signal) and direction of vibration (i.e. requiring the vibration be in a specific plane). Additional impedance in the other voltage reference lines, or the piezoelectric element, can require the generation of a negative pulse (i.e. the piezoelectric element must be flexed in the opposite direction) to activate the switch. Additional filters can be provided depending upon the particular watch/ stopwatch configuration to protect the integrated circuit (IC) in the stopwatch 10 from excessively high voltage levels from the piezoelectric element 16, which can extend the life of the product. If the piezoelectric element 16 is tied to either battery voltage $V_{cc}$ or ground, then the battery will tend to act as a capacitor and filter voltages from the piezoelectric element which are in excess of the $V_{cc}$ level. Additionally, since most commercially available stopwatches are provided with electrostatic discharge (ESD) circuitry, if short duration spikes do reach the IC, any ESD circuitry will inhibit the pulse. ESD circuitry is configured to become active when the voltage of the pulse from the piezoelectric element is greater than a diode drop above $V_{cc}$.

Figure 3:
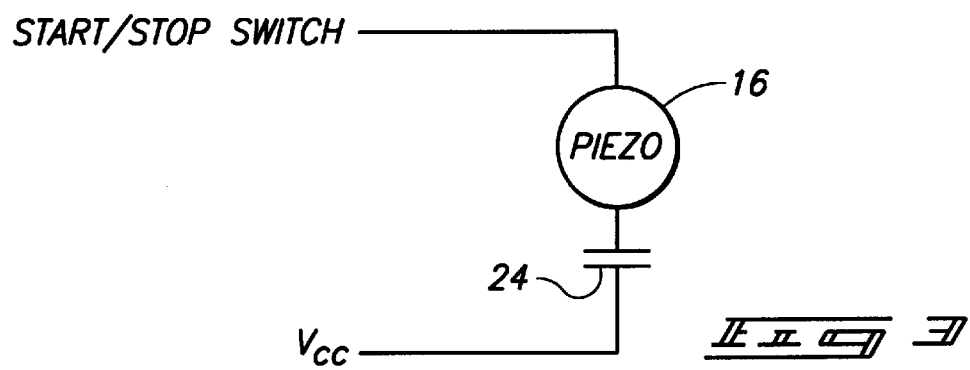
FIG. 3 is a schematic circuit diagram showing how a signal generator can be connected with an integral stopwatch in accordance with one embodiment of the present invention.

Turning to FIG. 3, in a variation on the first embodiment a small capacitor 24 (having an exemplary value of 0.01 uF) can be added in series with the piezoelectric element 16 as a simpler, lower cost filter to filter out high voltages from the piezoelectric element and thus protect the IC and the start-stop switch 22. With appropriate selection of the capacitor value, one can reduce spikes and still maintain sensitivity to the appropriate vibrations.

Figure 4:
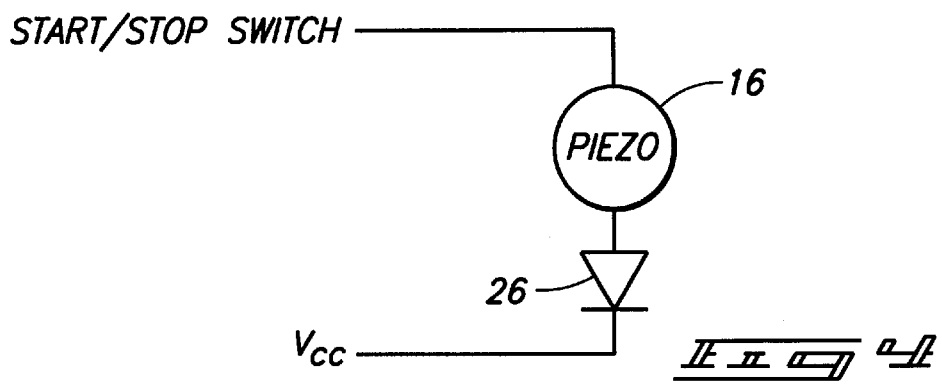
FIG. 4 is a schematic circuit diagram showing an alternate configuration of the embodiment shown in FIG. 3.

Turning to FIG. 4, in another variation on the first embodiment a low voltage signal diode 26 is placed in series between the piezoelectric element 16 and the battery line or the ground line $V_{cc}$ to filter out high voltages from the piezoelectric element and thus protect the IC and the start-stop switch 22. An exemplary diode is a 1N4148 diode.

Basic Counter Display Module

In a second embodiment of the invention the event counter comprising the basic watch/stopwatch module can be used as a counter by toggling the start/stop signal to cause the system to effectively count toggles rather than counting time. This permits the apparatus to be based on an inexpensive, commercially available system (such as a watch/stopwatch) which can further comprise an integrated LCD display driver. In this embodiment, rather than counting elapsed time as in the reaction timer embodiment, the apparatus counts events, such as pulses. The pulses can either be measured directly or by another system, and merely communicated to the event counter to be displayed. The event counter configuration in the second embodiment is quite similar to that of the first embodiment, with the exception that the signal generator is a counter circuit, as shown in FIG. 5. As with the reaction timer, the counter circuit is preferably provided with a filter in the manner shown in FIGS. 3 and 4 to protect the IC in the stop watch from high voltages where the signal generator is capable or generating voltages in excess of those which the start stop switch is intended to encounter.

In the embodiment shown in FIG. 5, the user initially sets the system into stopwatch mode using the mode switch 20 (if the stopwatch includes such a feature), and clears the display through the reset button 18. In this embodiment the reset button 18 can also serve as a reset to the counter circuitry 28 by electrically connecting the two, the exact connection being dependent on the design of the counter circuitry. The counter section can include a piezoelectric element or pressure element that detects the event of interest, such as an impact from a user in a martial arts application as shown in FIG. 1. In a counting configuration, following the event, and as a result thereof, the counter circuit 28 generates a two-pulse start/stop sequence pulse 30 on the start/stop line for each impact of interest. For example, if a user hit the target 152 times, there would be 152 start/stop sequences 30 spaced one 100th of a second apart. This causes the timer module to display "152" in the display 12.

The embodiment of the invention shown in FIG. 5 can alternatively be used to display any type of number generated by another circuit (a counter circuit 28), using the stopwatch as a apparatus and means for displaying the count generated by the counter circuit. For example, the counter circuit can be configured to include or receive a signal from a sensor configured to measure the strength of a strike or impact on the target 15 (see FIG. 1). If for example the sensor detected an impact of 562 units of force, the counter circuit 28 then sends a pulse train to the stopwatch of 562 start/stop sequences (1124 pulses 30) spaced one 100th of a second apart to display the number "562" on the display 12. The spacing of the sequence can be altered to permit display of the number in a different position on the display 12. For example, rather than showing the number in the 10th and 100th of a second space in the display 12, the pulse train can be configured at one second intervals between pulses to display the number in the larger display positions (e.g., the seconds, tens of seconds, and minutes positions).

This embodiment of the invention is particularly applicable in systems requiring a numeric display where slight inaccuracies are not a concern. However, any inaccuracies will be consistent on the same unit. For example, if a user hit a target 152 times and the unit displayed "153", the next time the user hit the target 152 times, it would still display "153". For improvement measurements where the user is attempting to approve his or her response ability, a less accurate implementation is typically sufficient. For example, if the counter read "164" the next time, the user can be assured that this was a definite improvement. If accuracy is an issue, the counter circuit 28 or complementary circuit(s) can be synchronized to the timing circuit's crystal (clock) to prevent erroneous counts. For example, if the user is comparing his/her skills with another person, synchronized timers can be utilized to improve consistency of reading between units.

Event Counter Including Signal Generator Internal to the Integral Stopwatch

In a first variation on the first and second embodiments, the signal generator can comprise a sensor internal to the integral stopwatch. For example, commercially available stop watches which are intended to be used in the present invention are typically provided with a piezoelectric element which is used to generate an audible sound (typically a "beep"). Such sounds are typically produced when stopwatch is started or stopped, or as an alarm. In the preferred embodiment, the piezoelectric element is used as the beeper that produces a sound upon activation of the start/stop switch. Thus, in the first variation of the first and second embodiments of the invention the stopwatch beeper piezoelectric element is used both a beeper (an output device) and as the signal generator, i.e., as a vibration sensing element (an input device). Depending on the particular stopwatch, the beeper signal output is typically a 4 kHz to 5 kHz square wave generated by the stopwatch IC to introduce a vibration in the piezoelectric element which results in a buzzing sound. The nature of a piezoelectric element is such that it can use electrical signals to produce vibrations (buzzing noises) and it can use external vibration to produce (or generate) electrical signals. When the stopwatch is struck (such as by hitting it or by dropping it or by adhering it to a vibrating surface), the piezoelectric element generates a sine wave output signal which is very low in energy content, of variable frequency, but can be very high in voltage, often in excess of 100v. As extremely high voltages can be detrimental to IC's, this is often filtered out to prevent damaging the circuit accidentally. In some stopwatches, this signal is not filtered. However, with most stopwatches, a filter is created to reject all frequencies except those of the buzzer frequency (between 4 kHz and 5 kHz) and reduce signal amplitude to around 2v. When the stopwatch filters higher voltage signals, this invention utilizes a wave shape discrimination circuit instead of signal strength to increase sensitivity to external impacts. The premise of the circuit is to identify a low intensity 4 kHz to 5 kHz sine wave and recognize it as an impact, instead of the 4 kHz to 5 kHz square wave used as the beep.

Turning to FIG. 6, a circuit diagram is show which discloses a filter 40 which can be used with an internal piezoelectric element R9, or in fact with the signal generator 16 of FIGS. 2 and 3, to protect the IC within the stopwatch from high voltage spikes which can be produced when the piezoelectric element is struck. The filer is configured with diodes D8 and D7 to utilize both positive and negative spikes (signals) resulting from impacts in either direction. Such voltage spikes are used to activate the start/stop switch 22. The filter 40 is further configured to filter both positive and negative signals produced by the piezoelectric element which can result from vibration in either direction. The filter 40 includes diodes D3, D4, D5, and D6 and which utilize a power source such as the clock battery in the manner of a large capacitor to filter out the large voltage spikes. Exemplary selection of the diodes is 1N4148 diodes.

Event Counter Including Signal Indicator

To increase the user's ability to recognize the start of the timer, a signal indicator such as an LED or some form of light (e.g. an incandescent lamp) can be used to supplement an audible indicator. Such is useful in environments where the audible sound can be too low in volume to be discernible, e.g. in a gymnasium. Thus, in a second variation on the first and second embodiments of the invention the event counter can further comprise a circuit for driving such a signal indicator, and more specifically, an LED. An LED is preferable over an incandescent lamp due to power requirements, life of the LED, and robustness (resistance to impact). However, the lowest voltage LED is 1.6v or 1.7v for a red LED, while the forward voltage of a green LED is a minimum of 2.1v. However, the typically system power supply is a 1.5v battery. This makes the use of a single 1.5v battery by itself useless for powering an LED. This invention provides an option of using a 0.9v to 1.5v battery to power a 2.1v LED. The circuit disclosed can also be used to drive backlighting LEDs in watch circuits as a lower cost and smaller packaging alternative to adding expensive 3v lithium batteries or to adding an additional 1.5v battery to increase the voltage to drive the LED.

The primary circuit components are an audible signal generator such as a piezoelectric element which is configured to generate a square wave signal, a current storage device such as an inductor, a power supply, the signal indicator, and a charge switch. The charge switch is activated by the square wave from the audible signal generator, allowing the power supply to charge the current storage device. The current storage device stores sufficient current to release a voltage spike sufficient to drive the LED when the charge switch is in the "off" position. Note that a capacitor can also be used to store electrical energy, and in an alternate variation, the current storage device is replaced with a capacitor and complementary circuitry.

Turning to FIG. 7, a signal indicator driving circuit 50 is shown. The circuit comprises a current storage device shown as inductor L1, a first resistor R10, a second resistor R11, a signal indicator shown as LED D9, and a charge switch shown as transistor Q4. The circuit 50 acts as a reduced charge pump used to activate the LED D9. Under normal circumstances, the piezoelectric element signal 52 "PIEZO HIGH" remains low when an impact is not received at the piezoelectric element and the buzzer is not buzzing. Charge switch Q4 is normally "off" and LED D9 is not conducting since the LED threshold voltage is higher than the system voltage Vcc. The piezoelectric element buzzer is activated by an essentially square wave shape signal that is a 50% duty cycle 0 to 1.5v signal with a 250 microsecond period (120″s to 130″s pulse duration). A series of 10 milliseconds of pulses typically comprise the complete 'buzz' duration. When the square wave from the "buzz" signal is applied to the base of transistor Q4, the inductor L1 charges while the square wave signal is high and then discharges through the LED D9 when the current path through first resistor R10 and transistor Q4 is cut off on a square wave low signal. During the charge time, transistor Q4 allows current to flow through first resistor R10 which permits inductor L1 to build up a large amount of current. When transistor Q4 shuts off during a square wave low signal, inductor L1 has no path through which to dump its current except through LED D9. The current stored in inductor L1 is thus discharged through LED D9 and effectively achieves whatever voltage is necessary to push current through D9 (for example, 2.1v in the event of a green LED). Although a single discharge of inductor L1 is insufficient to be visible, when a 10 msec square wave is put through this circuit it effectively creates 40 to 50 discharges of the inductor L1 through the LED D9, which is sufficient to create a visible flash of light. In fact, such will appear as a single flash of 10 msec in duration to the human eye. In addition, the battery voltage level $V_{cc}$ does not impact the brightness of the light since the inductor L1 stores the same amount of current during each pulse. An exemplary value for inductor L1 is 220 microHenry's. Exemplary values for resistors R10 and R11 are 100 ohms.

In the case where the system voltage $V_{cc}$ exceeds the activation voltage of the LED, such as can occur when a 1.5v battery can exceed 1.76v upon initial usage, the LED would be turned on constantly until the voltage of the battery dropped below the activation voltage of the LED. Additionally, the current storage device L1 is directly connected to the system voltage $V_{cc}$ which permits the inductor to drain the battery when not in use. To address these issues, a transistor can be added to isolate the signal activation circuit 50 from the power supply. The transistor can be controlled by the "PIEZO HIGH" signal to disconnect the inductor L1 when the buzzer is not in use.

Event Counter Including Timer Start Delay Feature

In certain applications it is desirable that the event counter be provided with a delay feature to delay the start of the clock. Preferably, the delay is random in length. Such a feature is useful for example where a single user desires to measure his or her reaction time to an event, as shown in FIG. 1. For example, when the user presses the "start" button on the reaction timer, a delay allows the user to get in position. Following the delay, the timer starts and the user is notified by a beep or a flash of light. The user then reacts by kicking the bag or the like, stopping the timer. A delay can also be used in a two-user situation so that the user being tested for reaction time does not anticipate the exact moment of the beep or flash of light. The random delay circuit disclosed herein utilizes other components from the event counter to simplify design.

The circuit disclosed herein provides a random delay without the use of a microprocessor. Instead, the circuit uses two different RC (resistor-capacitor) filter circuits and compares their discharge rates to generate a start pulse. Turning to FIG. 8, the RC filter circuits are charged off a circuit based on the resistance of a pressure cell 68 used as the 'delayed timer' button. Alternative, the pressure cell can be replaced with a low impedance switch and a resistor, or with a high impedance switch. This button measures the pressure used by the user to "press" on the button. In the alternate embodiment using the switch implementation, the duration of the time the switch is held down is measured. The pressure applied to the button and the level of the battery voltage determine the amount of charge applied to the RC circuits. The discharge difference between the two RC circuits then creates a pseudo-random time delay before activation of the start button. A piezoelectric element 16 on the back of the stopwatch 10 can be used to stop the timer following receipt of an impact from the user.

Turning to FIG. 9, one embodiment of a circuit for performing the random delay is shown. The random time delay circuit 60 is based off the variable charging of two RC circuits 62 and 64. This is implemented by placing a thin profile (e.g., 0.003" thick) force-sensing resistor (FSR) R2 as the controlling element in the charge circuit 66. In one example, the FSR R2 maintains approximately 4 Megohm, or a virtual open circuit when pressure is not applied. The charge transistor Q1 is biased with resistors R1 and R3 to maintain an "off" state when pressure is not applied. In one example, R1 and R3 are 250 Kohm and 130 Kohm respectively. Charge switch Q1 is operated in linear mode and generates a voltage at the emitter of Q1 proportional to the voltage applied to the base of Q1. When pressure is not applied to the FSR R2, the emitter voltage of Q1 is at ground and no charge is pushed into the RC circuits 62 and 64. As pressure is applied to the FSR R2, the resistance of R2 decreases, causing the voltage to increase on the base of Q1. The emitter voltage of Q1 increases, and upon reaching the forward voltage drop of diodes D1 and D2 (approximately 0.2v on an optimally selected diode), the RC circuits (R5/C1 and R6/C2) begin to charge. In one example diodes D1 and D2 are 1N4148 diodes. The maximum charge voltage on each of the RC circuits is dependent upon the $V_{cc}$ level. If the circuit 60 is driven off a 1.5v watch battery, the $V_{cc}$ level can vary from as high as 1.76v to as low as 0.9v during normal operation. As watch/stopwatch IC's typically begin to malfunction at 0.9v, this level is preferably used as the design voltage minimum.

The two RC circuits 62 and 64 are set at different, predetermined discharge rates. In one example, R5/C1 of circuit 62 is set to a tau value of 16.75 by selecting R5=150.9 Kohm and C1=111 uF, while R6/C2 of circuit 64 is set to a tau value of 4.30 by selecting R6=38.7 Kohm and C2 set to 111 uF. FIG. 10 is a graph showing the two discharge curves, V (t) for R5/C1 and V2 (t) for R6/C2. Both start at 1.8 V in the example shown (assuming full charge from the random charge circuit 66) and decrease at different rates to 0v. The difference (shown as Vdiff (t)) determines when the start/stop switch is activated. Vdiff increases as the RC timing discharge rates decrease at different rates and then eventually decreases as the RC circuits completely discharge. When Vdiff reaches a level of 0.7v, the Start/Stop switch 22 is triggered (only on rising edge). This is accomplished through the use of transistor Q3 of FIG. 9, which is turned on when the R5/C1 circuit is 0.7v greater than the R6/C2 circuit. Transistor Q5 and resistor R7 (box 70) can be added to the circuit 60 to prevent R5/C1 from interacting with R6/C2 and charging it once Q3 is activated. Once the transistors Q3 and Q5 are on, the start/stop Switch 22 receives an "on" pulse of voltage $V_{cc}$ which causes the timer to start. Note that in this example, the 0.7v difference occurs at 3.9 seconds after the press of the pressure switch and assumed maximum charging as shown in FIG. 10. At a lesser charge level, the Vdiff signal will be advanced and will occur at an earlier time, e.g. 2 seconds. By adjusting the tau values of R5/C1 and R6/C2, different discharge rates can be obtained to adjust the maximum and minimum time delays. In a particular implementation, some adjustment of the tau values may be necessary to prevent the start/stop switch from remaining high for too long and staying high when the piezoelectric element impulse is received. For example, the start/stop switch 22 should go low a maximum of 250 milliseconds following to insure receipt of the quickest pulse from a black belt user.

For a user to receive feedback that they have activated the delay timer, the reset switch can be configured to be activated by transistor Q2 and resistor R8 (box 72) of FIG. 9 upon initial charging of the RC circuits 62 and 64. This prevents the user from having to reset the timer upon each reactivation of the delay circuit.

Commercial Applicability

The event timer disclosed herein finds particular commercial applicability in any low cost, high volume system where measurement of reaction time or counting occurrences of an action that generates a vibration is required. Exemplary fields include law enforcement, sporting goods, game products, martial arts, boxing, ball games (number of strikes against a board), board games or video games, quick draw gun competitions, field sobriety testers (reaction delay), or security systems activation.

Method For Driving A Circuit Device

Another aspect of the invention includes a method of driving a circuit device requiring a first voltage by using reference voltage having a lower value than the first voltage. For example, a circuit device such as an LED which requires 2.1v to be driven can be driven by a 1.5v battery using the method of the present invention. The method makes use of a signal device which generates a voltage pulse of insufficient power to drive the circuit device. An example of such a signal device is a piezoelectric element which can be used to generate an audible signal.

The method of the present invention includes the steps of providing a current storage device in electrical communication with the reference voltage and the circuit device. An example of a current storage device is the capacitor L1 of FIG. 7. The next step of the method includes providing a switch activatable to a first position by the voltage pulse from the signal device. Such an example of switch is transistor Q4 of FIG. 7. The switch is configured to allow the reference voltage $V_{cc}$ to flow electrical current through the current storage device L1 when the switch is in the first position, and prevent flow of current through the current storage device when the switch is in a second position. The switch is in the second position in absence of the voltage pulse, that is, at the low of the square wave.

The next step of the method includes applying the reference voltage $V_{cc}$ to the circuit device, which can be the LED D9 of FIG. 7. The reference voltage is also applied to the switch Q4 when the switch is in the second position, that is, in a "off" position. Thereafter, the voltage pulse from the signal device such as the piezoelectric element is applied to the switch Q4 to allow the current to flow into the current storage device L1 and thereby store sufficient current to drive the circuit device D9 with the first voltage. Finally, the voltage pulse from the signal device is removed from the switch Q4 to allow the current to flow from the current storage device L1 through the circuit device D9 with sufficient voltage to drive the circuit device.

We claim:

1. An event counter comprising:
    an integral stop watch comprising an internal clock for generating electrical clock pulses of a predetermined period, a timing circuit for counting a number of the clock pulses, an output circuit for outputting an elapsed number of clock pulses generated by the clock, a reset switch for resetting the output circuit to a base level, and a start-stop switch for starting and stopping the timing circuit; and
    a pulse signal generator configured to alter the state of the start-stop switch as a result of a pulse signal generated by the pulse signal generator.

2. The event counter of claim 1 wherein the pulse signal generator is external to the integral stop watch.

3. The event counter of claim 2 wherein the internal clock further comprises an internal battery configured to power the clock and drive the output circuit.

4. The event counter of claim 2 wherein the external pulse generator comprises a piezoelectric element.

5. The event counter of claim 4 wherein the piezoelectric element is configured to generate the pulse signal when impacted.

6. The event counter of claim 5 wherein the start-stop switch defines selectable start and stop states for the clock circuit, and wherein the integral stop watch is configured to receive the pulse signal and select the stop-state of the start-stop switch upon receipt of the pulse signal.

7. The event counter of claim 6 wherein the integral stop watch further comprises a digital display configured in conjunction with the output circuit to display a number indicative of the number of clock pulses generated prior to receipt of the pulse signal.

8. The event counter of claim 6 wherein the piezoelectric element comprises a first electrical contact in electrical communication with the start-stop switch, and a second electrical contact in connection with electrical ground.

9. The event counter of claim 8 further comprising a power supply, and wherein the second electrical contact is in electrical communication with the power supply.

10. The event counter of claim 8 further comprising a capacitor in series between the second electrical contact and the power supply.

11. The event counter of claim 8 further comprising a diode in series between the second electrical contact and the power supply, the diode configured to allow current to flow in the direction of the power supply.

12. The event counter of claim 2 wherein the external pulse generator comprises a counter circuit configured to generate two pulse signals in response to a single event, the two pulse signals altering the state of the start-stop switch to start and stop the clock circuit and thereby generate a single clock pulse.

13. The event counter of claim 2 wherein the external pulse generator comprises a counter circuit configured to generate a plurality of pulse signals of an even number in proportion to the magnitude of a single event, the signals altering the state of the start-stop switch a number of times equal to the plurality of pulse signals to start and stop the clock circuit the same number of times and thereby generate a number of clock pulses equal to half of the number of pulse signals.

14. The event counter of claim 13 wherein the external pulse generator comprises a piezoelectric element.

15. The event counter of claim 13 wherein the external pulse generator comprises a force sensing element.

16. The event counter of claim 13 wherein the integral stop watch further comprises a digital display configured in conjunction with the output circuit to display a number indicative of the number of clock pulses generated by the plurality of pulse signals.

17. The event counter of claim 4 wherein the piezoelectric element generates the pulse signal as a signal voltage in response to an input, and wherein the event counter further comprises a filter to limit the size of the signal voltage sent to the start-stop switch.

18. The event counter of claim 17 wherein:
    the piezoelectric element comprises a first electrical contact and a second electrical contact; and
    the filter comprises at least one of:
        a first diode in series with the first electrical contact and the stop-start switch and configured to allow current to flow to the start-stop switch; and
        a second diode in series with the second electrical contact and the stop-start switch and configured to allow current to flow to the start-stop switch.

19. The event counter of claim 18 further comprising at least one of:
    a third diode in parallel with the first diode and a reference voltage and configured to allow current to flow to the reference voltage; and
    a fourth diode in parallel with the second diode configured to allow current to flow to the reference voltage.

20. The event counter of claim 18, and further comprising at least one of:
    a fifth diode in parallel with the first diode and an electrical ground reference voltage and configured to allow current to flow to the electrical ground reference; and
    a sixth diode in parallel with the second diode and configured to allow current to flow to the electrical ground reference.

21. The event counter of claim 1 wherein the integral stop watch further comprises an audible signal generator comprising an internal piezoelectric element, and wherein the pulse signal generator comprises the piezoelectric element.

22. The event counter of claim 21 wherein the piezoelectric element generates the pulse signal as a signal voltage in response to an input, and wherein the event counter further comprises a filter to limit the size of the signal voltage sent to the start-stop switch.

23. The event counter of claim 21 further comprising wave shape discrimination circuitry configured to distinguish signals generated by the piezoelectric element as being either square wave signals or sine wave signals, and to identify the sine wave signals as being signal pulses.

24. The event counter of claim 1 further comprising:
   a power supply configured to drive the clock and having a reference voltage;
   an audible signal generator comprising a piezoelectric element configured to generate a square wave pulse audible signal, the square wave signal comprising a high signal component and a low signal component;
   a signal indicator configured to indicate the start of the clock;
   a current storage device in series with the signal indicator and the reference voltage; and
   a charge switch activated by a selected one of the square wave signal high signal component and low signal component to allow current to flow from the reference voltage through the current storage device.

25. The event counter of claim 24 wherein the current storage device comprises an inductor.

26. The event counter of claim 24 wherein the charge switch comprises a transistor having a base configured to receive the square wave signal, and an emitter and a collector, one of the emitter and the collector being connected to the current storage device and the signal indicator, and the other of the emitter and the collector being connected to a voltage source having a lower potential than the reference voltage.

27. The event counter of claim 26 further comprising a current resisting element in series with the current storage device and one of the emitter or the collector being connected to the current storage device.

28. The event counter of claim 24 wherein the signal indicator comprises a light emitting diode.

29. The event counter of claim 24 further comprising a current storage switch configured to isolate the current storage device from the signal indicator in the absence of the selected one of the square wave signal high signal component and the low signal component used to activate the charge switch.

30. The event counter of claim 29 wherein the current storage switch comprises a transistor having a base configured to receive the square wave signal, an emitter, and a collector connected in series between the current storage device and the signal indicator.

31. The event counter of claim 1 further comprising a random time delay circuit configured to randomly activate the start-stop switch, comprising:

a first transistor having a collector, an emitter and a base, one of the collector or the emitter being connected to a system voltage, and the base being connected to a variable current switch configured to output a variable current, the variable current being in series with the system voltage;

a first RC circuit having a first node connected to one of the first transistor emitter or the first transistor collector, and a second node connected to ground through a first parallel RC configuration having a first tau value;

a second RC circuit having a first node connected to the other of the first transistor emitter and collector, and a second node connected to ground through a second parallel RC configuration having a second tau value; and a second transistor having a collector, and emitter and a base, the base being connected to the first RC circuit first node, one of the collector or the emitter being connected to the system voltage, and the other of the collector or the emitter being connected to the start-stop switch.

32. The event counter of claim 31 wherein the variable current switch comprises a force sensing resistor.

33. The event counter of claim 31 wherein the variable current switch comprises a high impedance switch.

34. The event counter of claim 31 wherein the variable current switch comprises a low impedance switch and a resistor in series.

35. The event counter of claim 31 wherein:
   the first RC circuit further comprises a first diode in series with the first RC circuit first node and the other of the first transistor emitter or the first transistor collector, and configured to allow current flow toward the first RC circuit first node; and
   the second RC circuit further comprises a second diode in series with the second RC circuit first node and the other of the first transistor emitter or the first transistor collector, and configured to allow current flow toward the second RC circuit first node.

36. The event counter of claim 31 further comprising a third transistor having a base connected to the second RC circuit first node, and a collector and an emitter, and wherein one of the collector or the emitter is connected to the start-stop switch, and the other of the collector or the emitter is connected to electrical ground.

37. The event counter of claim 36 further comprising a fourth transistor having a base connected to the second RC circuit first node, and a collector and an emitter, and wherein one of the collector or the emitter is connected to the reference voltage, and the other of the collector or the emitter is connected to a reset switch configured to reset the output circuit to a zero state.

* * * * *